(12) United States Patent
Genta et al.

(10) Patent No.: US 11,865,928 B2
(45) Date of Patent: Jan. 9, 2024

(54) GENERATING POWER WITH A CONDUIT INSPECTION TOOL

(71) Applicant: Saudi Arabian Oil Company, Dhahran (SA)

(72) Inventors: Pablo Daniel Genta, Dhahran (SA); Mohammed Zulaly, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 65 days.

(21) Appl. No.: 17/534,852

(22) Filed: Nov. 24, 2021

(65) Prior Publication Data
US 2023/0158900 A1 May 25, 2023

(51) Int. Cl.
*B60L 53/12* (2019.01)
*H02K 7/02* (2006.01)
(Continued)

(52) U.S. Cl.
CPC .............. *B60L 53/12* (2019.02); *B08B 9/049* (2013.01); *B60L 50/30* (2019.02); *B60L 50/53* (2019.02);
(Continued)

(58) Field of Classification Search
CPC . F16L 55/26; F16L 55/30; F16L 55/28; F16L 55/32; F16L 55/34; F16L 55/36;
(Continued)

(56) References Cited

U.S. PATENT DOCUMENTS 2,493,504 A 1/1950 Roberts
2,826,077 A 3/1958 Walker
(Continued)

FOREIGN PATENT DOCUMENTS

CA 1286772 7/1991
CA 2218029 4/1999
(Continued)

OTHER PUBLICATIONS

Crp.co.uk [online], "Inline Sampling" retrieved from URL <http://www.crp.co.uk/sampling.aspx?page=17>, available on or before Jun. 2008, retrieved on Mar. 12, 2020, 2 pages.
(Continued)

*Primary Examiner* — Emma K Frick
(74) *Attorney, Agent, or Firm* — Fish & Richardson P.C.

(57) ABSTRACT

A conduit inspection tool system includes a conduit inspection tool that includes a body that includes one or more wheels configured to move the body through and in contact with a conduit; at least two power generating sub-systems coupled to the body, each of the at least two power generating sub-systems configured to generate electrical power to operate the one or more wheels to move the body through and in contact with the conduit; and at least one energy storage device electrically coupled to the at least two power generating sub-systems, the at least one energy storage device configured to store electrical power generated by the at least two power generating sub-systems; and a control system communicably coupled to the at least two power generating sub-systems and the at least one energy storage device.

30 Claims, 10 Drawing Sheets

(51) Int. Cl.
*H02K 7/116* (2006.01)
*B60L 50/30* (2019.01)
*B60L 50/90* (2019.01)
*B60L 50/60* (2019.01)
*B08B 9/049* (2006.01)
*F16L 55/32* (2006.01)
*B60L 50/53* (2019.01)
*F16L 101/30* (2006.01)
*F16L 101/12* (2006.01)

(52) U.S. Cl.
CPC .............. *B60L 50/60* (2019.02); *B60L 50/90* (2019.02); *F16L 55/32* (2013.01); *H02K 7/025* (2013.01); *H02K 7/116* (2013.01); *B08B 2209/04* (2013.01); *F16L 2101/12* (2013.01); *F16L 2101/30* (2013.01)

(58) Field of Classification Search
CPC . F16L 55/38; F16L 55/40; F16L 55/42; F16L 55/44; F16L 55/265; F16L 2101/12; F16L 2101/30; B08B 9/049
See application file for complete search history.

(56) References Cited

U.S. PATENT DOCUMENTS

| | | | |
|---|---|---|---|
| 3,265,083 A | 8/1966 | Sachnik | |
| 3,284,702 A * | 11/1966 | Ownby | G01N 27/9093 324/559 |
| 3,460,028 A | 8/1969 | Beaver et al. | |
| 3,539,915 A * | 11/1970 | Wood | G01N 27/904 324/220 |
| 4,209,029 A | 6/1980 | Pennington | |
| 4,391,152 A | 7/1983 | Ellett | |
| 4,435,872 A | 3/1984 | Leikam | |
| 4,562,749 A | 1/1986 | Clark | |
| 4,625,571 A | 12/1986 | Slater | |
| 4,891,115 A * | 1/1990 | Shishkin | F16L 58/02 204/224 R |
| 4,906,136 A | 3/1990 | Norbom | |
| 4,945,775 A | 8/1990 | Adams et al. | |
| 4,976,144 A | 12/1990 | Fitzgerald | |
| 5,044,827 A | 9/1991 | Gray | |
| 5,139,576 A | 8/1992 | Davis | |
| 5,186,757 A | 2/1993 | Abney, Sr. | |
| 5,197,328 A | 3/1993 | Fitzgerald | |
| 5,203,646 A * | 4/1993 | Landsberger | B08B 9/049 901/44 |
| 5,272,647 A | 12/1993 | Hayes | |
| 5,329,465 A | 7/1994 | Arcella et al. | |
| 5,406,855 A | 4/1995 | Welker | |
| 5,413,002 A | 5/1995 | Jiakoot et al. | |
| 5,430,643 A | 7/1995 | Seraji | |
| 5,549,137 A | 8/1996 | Lenz et al. | |
| 5,565,633 A | 10/1996 | Wernicke | |
| 5,748,469 A | 5/1998 | Pyotsia | |
| 5,763,794 A | 6/1998 | Marrelli | |
| 5,769,955 A | 6/1998 | Kozisek | |
| 6,131,609 A | 10/2000 | Metso et al. | |
| 6,234,717 B1 | 5/2001 | Corbetta | |
| 6,243,657 B1 | 6/2001 | Tuck et al. | |
| 6,289,752 B1 | 9/2001 | Nimberger et al. | |
| 6,475,294 B2 | 11/2002 | McCanna et al. | |
| 6,880,195 B1 * | 4/2005 | Bahari | B08B 9/049 15/104.061 |
| 6,917,176 B2 * | 7/2005 | Schempf | G01M 3/005 901/44 |
| 7,210,364 B2 * | 5/2007 | Ghorbel | F16L 55/26 73/865.8 |
| 7,617,558 B2 * | 11/2009 | Boe | B08B 9/051 15/104.061 |
| 7,940,189 B2 | 5/2011 | Brown | |
| 8,015,695 B2 | 9/2011 | Polivka et al. | |
| 8,237,920 B2 | 8/2012 | Jones et al. | |
| 8,397,670 B2 | 3/2013 | Berg | |
| 8,768,631 B2 | 7/2014 | Wilke | |
| 8,800,584 B2 | 8/2014 | McNabney et al. | |
| 8,805,579 B2 * | 8/2014 | Skrinde | B25J 11/0085 134/18 |
| 8,838,413 B2 | 9/2014 | Genta | |
| 8,850,880 B2 | 10/2014 | Püttmer | |
| 10,317,718 B2 | 6/2019 | Ihalainen et al. | |
| 10,344,782 B2 | 7/2019 | Penning et al. | |
| 10,429,427 B2 | 10/2019 | Fink et al. | |
| 10,955,082 B2 | 3/2021 | Genta | |
| 11,371,319 B2 * | 6/2022 | Al Mulhem | E21B 33/138 |
| 11,604,169 B2 * | 3/2023 | Du | F16L 55/32 |
| 2003/0037830 A1 | 2/2003 | Lee | |
| 2003/0154769 A1 | 8/2003 | Tucker | |
| 2004/0074030 A1 | 4/2004 | Nehrbass | |
| 2004/0158355 A1 | 8/2004 | Holmqvist et al. | |
| 2007/0177944 A1 | 8/2007 | Smith | |
| 2007/0214590 A1 | 9/2007 | Boe | |
| 2008/0072963 A1 | 3/2008 | Strohmeier et al. | |
| 2009/0152520 A1 | 6/2009 | Hepburn | |
| 2010/0104401 A1 | 4/2010 | Hopkins | |
| 2010/0305875 A1 | 12/2010 | Williams et al. | |
| 2011/0106362 A1 | 5/2011 | Seitz | |
| 2011/0114119 A1 | 5/2011 | Yang et al. | |
| 2012/0193154 A1 | 8/2012 | Wellborn et al. | |
| 2013/0110418 A1 | 5/2013 | Nousiainen | |
| 2016/0169436 A1 | 6/2016 | Sander | |
| 2016/0340161 A1 | 11/2016 | Olivier | |
| 2016/0369934 A1 | 12/2016 | Penza | |
| 2018/0356314 A1 | 12/2018 | Lagus | |
| 2020/0130030 A1 * | 4/2020 | Punpruk | B23K 37/0217 |
| 2022/0003638 A1 | 1/2022 | Al Moaikel et al. | |
| 2022/0345006 A1 * | 10/2022 | Soliman | B08B 9/0553 |

FOREIGN PATENT DOCUMENTS

| | | |
|---|---|---|
| CA | 2520332 | 7/2008 |
| EP | 0315391 | 4/1994 |
| GB | 2540583 | 1/2017 |
| WO | WO 2010036932 | 4/2010 |
| WO | WO 2010072403 | 7/2010 |
| WO | WO 2015020986 | 2/2015 |
| WO | WO 2015134482 | 9/2015 |
| WO | WO 2015153106 | 10/2015 |

OTHER PUBLICATIONS

Dopak.com [online], "Sampling Systems: In Line Liquid Samplers (DPT Series)" retrieved from URL <https://www.dopak.com/products/product-overview/sampling-systems/closed-sampling/liquid-samplers/in-line-liquid-samplers-dpt-series.html>, available on or before Feb. 2020, retrieved on Mar. 12, 2020, 2 pages.

Intertek.com [online], "Petroleum Pipeline Services" retrieved from URL <https://www.intertek.com/petroleum/testing/pipeline/>, available on or before Apr. 2019, retrieved on Mar. 12, 2020, 5 pages.

Online-electronics.com [online], "Meg Arts" retrieved from URL <https://www.online-electronics.com/our-products/datalogging-testing/meg-arts>, available on or before 2018, retrieved on Mar. 12, 2020, 3 pages.

Sensiaglobal.com [online], "In-Line Sampling System" retrieved from URL <https://www.sensiaglobal.com/Measurement/Types/Sampling/Sampling-Systems/In-Line-Sampling-System>, available on or before 2020, retrieved on Mar. 12, 2020, 4 pages.

Wateronline.com [online], "A Laboratory in a Pipeline Pig" retrieved from URL <https://www.wateronline.com/doc/a-laboratory-in-a-pipeline-pig-0001>, published Aug. 12, 2011, retrieved on Mar. 12, 2020, 2 pages.

PCT International Search Report and Written Opinion in International Appln. No. PCT/US2021/039542, dated Oct. 20, 2021, 15 pages.

* cited by examiner

GENERATING POWER WITH A CONDUIT INSPECTION TOOL

TECHNICAL FIELD

The present disclosure describes apparatus, systems, and methods for generating power with a conduit inspection tool, such as a pipeline scraper.

BACKGROUND

Conduits, such as hydrocarbon pipelines, often require inspection or cleaning by tools that are inserted into the conduits and move through the conduits. In some cases, a tool moving through such conduits can become stuck, for example, due to loss of power. In some other cases, data that is being recorded by the tool as it moves through the conduits can become lost due to a loss of power of the tool.

SUMMARY

In an example implementation, a conduit inspection tool system includes a conduit inspection tool that includes a body that includes one or more wheels configured to move the body through and in contact with a conduit; at least two power generating sub-systems coupled to the body, each of the at least two power generating sub-systems configured to generate electrical power to operate the one or more wheels to move the body through and in contact with the conduit; and at least one energy storage device electrically coupled to the at least two power generating sub-systems, the at least one energy storage device configured to store electrical power generated by the at least two power generating sub-systems; and a control system communicably coupled to the at least two power generating sub-systems and the at least one energy storage device.

In an aspect combinable with the example implementation, the at least two power generating sub-systems include a wheel generator electrically coupled to the one or more wheels and including a power generator configured to generate alternating electrical power from movement of the one or more wheels in the conduit.

In another aspect combinable with any of the previous aspects, the at least two power generating sub-systems include a wheel-pipe coupler generator that includes one or more gears rotatingly coupled to the one or more wheels and a flywheel, the flywheel configured to generate direct electrical power from rotation of the one or more gears based on movement of the one or more wheels in the conduit.

In another aspect combinable with any of the previous aspects, the at least one energy storage device includes the flywheel.

In another aspect combinable with any of the previous aspects, the at least two power generating sub-systems include a Kaplan turbine generator configured to generate alternating electrical power based on a flow of fluid in the conduit and through the Kaplan turbine generator when the one or more wheels are immobile in the conduit.

In another aspect combinable with any of the previous aspects, the at least one energy storage device includes an electrical energy storage unit and a mechanical energy storage unit.

In another aspect combinable with any of the previous aspects, the electrical energy storage unit includes one or more batteries, and the mechanical energy storage unit includes a flywheel.

Another aspect combinable with any of the previous aspects further includes a power conditioning unit electrically coupled between the at least two power generating sub-systems and the at least one energy storage device.

Another aspect combinable with any of the previous aspects further includes an external charging sub-system configured to transfer electrical power from an external charge source to the at least one energy storage device.

In another aspect combinable with any of the previous aspects, the external charging sub-system includes one or more permanent magnets and one or more receiving coils mounted in the body.

In another aspect combinable with any of the previous aspects, the one or more receiving coils is configured to receive an electric charge from one or more power coils of the external charge source positioned adjacent the body.

In another aspect combinable with any of the previous aspects, the one or more permanent magnets is configured to generate an alternating magnetic flux based on the electric charge to generate alternating electric power.

In another aspect combinable with any of the previous aspects, the conduit includes a hydrocarbon pipeline.

In another aspect combinable with any of the previous aspects, the conduit inspection tool includes a pipeline scraper.

In another example implementation, a method for operating a conduit inspection tool in a conduit includes positioning a conduit inspection tool in the conduit, the conduit inspection tool including a body that includes one or more wheels, at least two power generating sub-systems coupled to the body, and at least one energy storage device electrically coupled to the at least two power generating sub-systems; moving the body through and in contact with the conduit through the one or more wheels; generating electrical power by at least one of the at least two power generating sub-systems by the movement; and providing at least a portion of the generated electrical power to the at least one energy storage device to store the portion of the generated electrical power.

In an aspect combinable with the example implementation, generating electrical power includes generating electrical power with a wheel generator electrically coupled to the one or more wheels and including a power generator configured to generate alternating electrical power from movement of the one or more wheels in the conduit.

In another aspect combinable with any of the previous aspects, generating electrical power includes generating electrical power with a wheel-pipe coupler generator that includes one or more gears rotatingly coupled to the one or more wheels and a flywheel, the flywheel configured to generate direct electrical power from rotation of the one or more gears based on movement of the one or more wheels in the conduit.

In another aspect combinable with any of the previous aspects, the at least one energy storage device includes the flywheel.

In another aspect combinable with any of the previous aspects, the at least two power generating sub-systems include a Kaplan turbine generator configured to generate alternating electrical power based on a flow of fluid in the conduit and through the Kaplan turbine generator when the one or more wheels are immobile in the conduit.

In another aspect combinable with any of the previous aspects, the at least one energy storage device includes an electrical energy storage unit and a mechanical energy storage unit.

In another aspect combinable with any of the previous aspects, the electrical energy storage unit includes one or more batteries, and the mechanical energy storage unit includes a flywheel.

Another aspect combinable with any of the previous aspects further includes rectifying at least a portion of the generated electrical power with a power conditioning unit electrically coupled between the at least two power generating sub-systems and the at least one energy storage device.

Another aspect combinable with any of the previous aspects further includes transferring electrical power from an external charge source through an external charging sub-system to the at least one energy storage device.

In another aspect combinable with any of the previous aspects, transferring electrical power from an external charge source includes generating an electric charge from one or more power coils of an external charge source positioned adjacent the body; transferring the generated electrical charge from the one or more power coils to one or more receiving coils mounted in the body; generating an alternating magnetic flux with one or more permanent magnets based on the electric charge; and generating alternating electric power from the alternating magnetic flux.

In another aspect combinable with any of the previous aspects, the conduit includes a hydrocarbon pipeline.

In another aspect combinable with any of the previous aspects, the conduit inspection tool includes a pipeline scraper.

Implementations of a conduit inspection tool according to the present disclosure may include one or more of the following features. For example, a conduit inspection tool according to the present disclosure can include one or more internal power generation devices. As another example, a conduit inspection tool according to the present disclosure can receive a power charge from external sources. A conduit inspection tool, as an in-line inspection scraper, according can sustain an energy power level in case that the scraper gets stuck in a position within a pipeline, with the purpose of supplying power to keep the scraper in condition to transmit the stored inspection data to an operator.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
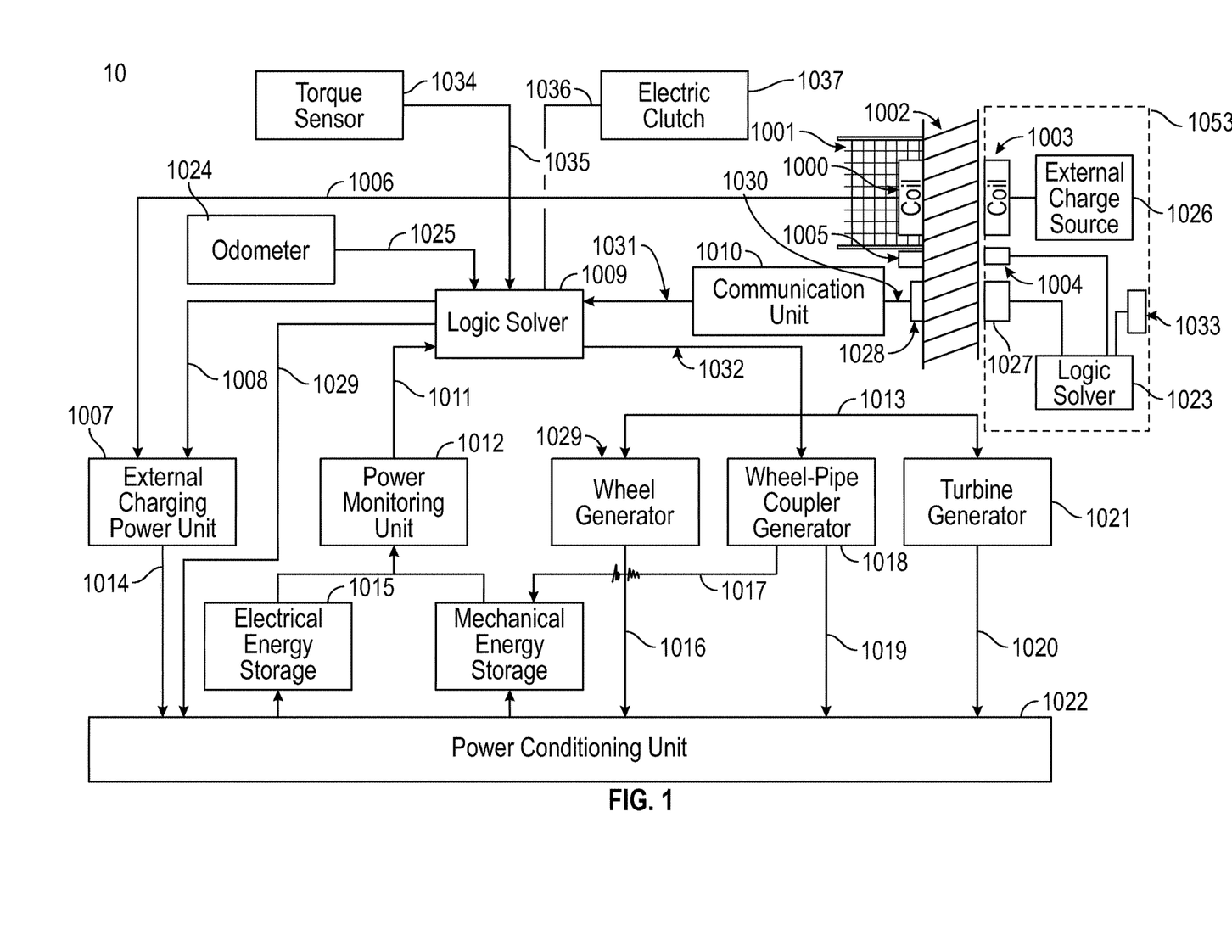
FIG. 1 is a function block diagram of an example implementation of a conduit inspection tool according to the present disclosure.

FIG. 1 is a function block diagram of an example implementation of a conduit inspection tool 10 according to the present disclosure. Conduit inspection tool 10, for example, can be a tool that is moved, in some aspects under its own power, through a conduit (for example, a hydrocarbon pipeline) for the purpose of cleaning an interior surface of the conduit, taking measurements of the conduit (or a fluid within the conduit), or otherwise. For example, conduit inspection tool 10 includes, as described herein, one or more components for power generation, electrical charging, and communication of status data from the tool 10 while within conduits flowing fluid (such as hydrocarbon fluids).

In some aspects, the tool 10 can communicate to a stuck scraper at any point along a conduit, collect information from the stuck scraper, and travel back to a point of departure. In this way of operation, the tool 10 can be used as a data collector. In some aspects, this type of operation of tool 10 includes an operator changing a flow direction and a bidirectional design of the scraper body discs (which is a commercial available scraper/pipeline pig). This is normally done in bidirectional flow pipelines.

In some aspects, the tool 10 can travel counter flow, which is also another possible construction of a scraper. In another operating mode, the tool 10 can be used to charge (with electrical power) a stuck scraper to allow a power level to be sustained. In this way of operation, a pre-powered tool 10 is inserted into the conduit and travels in the direction of the flow to the location of the stuck scraper, then it electrically couples to the stuck scraper to charge it. The coupling can be achieved by electromagnetic coupling.

In another example operating mode, the tool 10 can be used as a rescue device. In this way, the tool 10 is pre-charged, inserted in the conduit to travel in the flow direction until it reaches the position of a stuck scraper and establishes mechanical contact with the stuck scraper. Then, the tool 10 extends the generator wheel to reach contact with the inner conduit walls. The electrical power is used to apply an extra force to the stuck scraper and assist it in moving as an additional force to the fluid pressure applied to the tool 10. In pipelines, stuck scrapers are normally moved by inserting cleaning scrapers that push them to the end of the line. The conventional pushing force is the same fluid that pressurized a rescue scraper to push both the rescue scraper and the stuck scraper.

In another example operation, the tool 10 can be placed inside a conventional cleaning scraper body to charge a set of scraper batteries. In another example operation, the tool 10 can be equipped with pre-charged batteries and inserted in the conduit to travel to reach the location of a stuck scraper. The tool 10 can carry on its front side a magnetized pushing ring which, in contact with the stuck scraper, is attached magnetically to the tail part of the body of the stuck scraper.

Figure 8A:
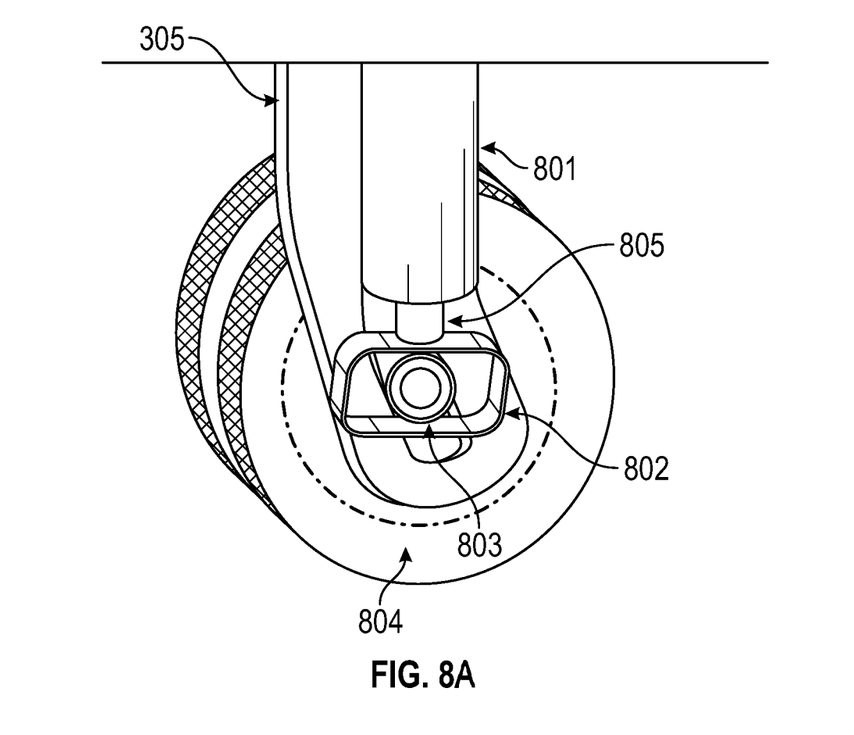
FIG. 8A shows an example implementation of wheels and a push-pull mechanism of a wheel-pipe coupler generator of a conduit inspection tool according to the present disclosure.

In example implementations, the conduit inspection tool 10 can include a body configured to be disposed within a conduit flowing a fluid. The conduit inspection tool 10 can include a power storage unit, for example a battery and a fly-wheel. In some aspects, the conduit inspection tool 10 can include one or more power generator units, one or more dual electrical and mechanical energy storage units, a logic solver with communication unit and non-volatile memory, an external charge coupling unit, and power monitor sensor to measure energy storage. In some aspects, the power generator unit(s) include an electrical generator wheel assembly coupled to a body of the conduit inspection tool 10, a mechanical flywheel accumulator coupled to a pivoting wheel assembly that mechanically contact the pipe-wall upon receiving a control signal from the logic solver, and a turbine generator assembly. The electrical storage units can be, for example, a battery bank, a flywheel, or a combination thereof. In some aspects, the conduit inspection tool 10 is a pipeline scraper that As shown in FIG. 1, a wheel generator 1029 supplies (for example, alternating) electrical power 1016 to a power conditioning unit 1022, which (if necessary) rectifies the power input signal and charges a battery unit 1015. A logic solver 1009 (for example, a controller or control system of the conduit inspection tool 10) receives a speed signal from an odometer 1024. When the logic solver 1009 determines that the speed of the conduit inspection tool 10 reaches a required condition (for example, as preset or programed by an operator of the conduit inspection tool 10), the logic solver 1009 send a signal 1032 to pull out a piston of a solenoid 801 (shown in FIG. 8), contact wheels 914 (shown in FIG. 9), establish mechanical contact with an inner wall of a conduit (or pipeline) 913 (also shown in FIG. 9).

Figure 7A:
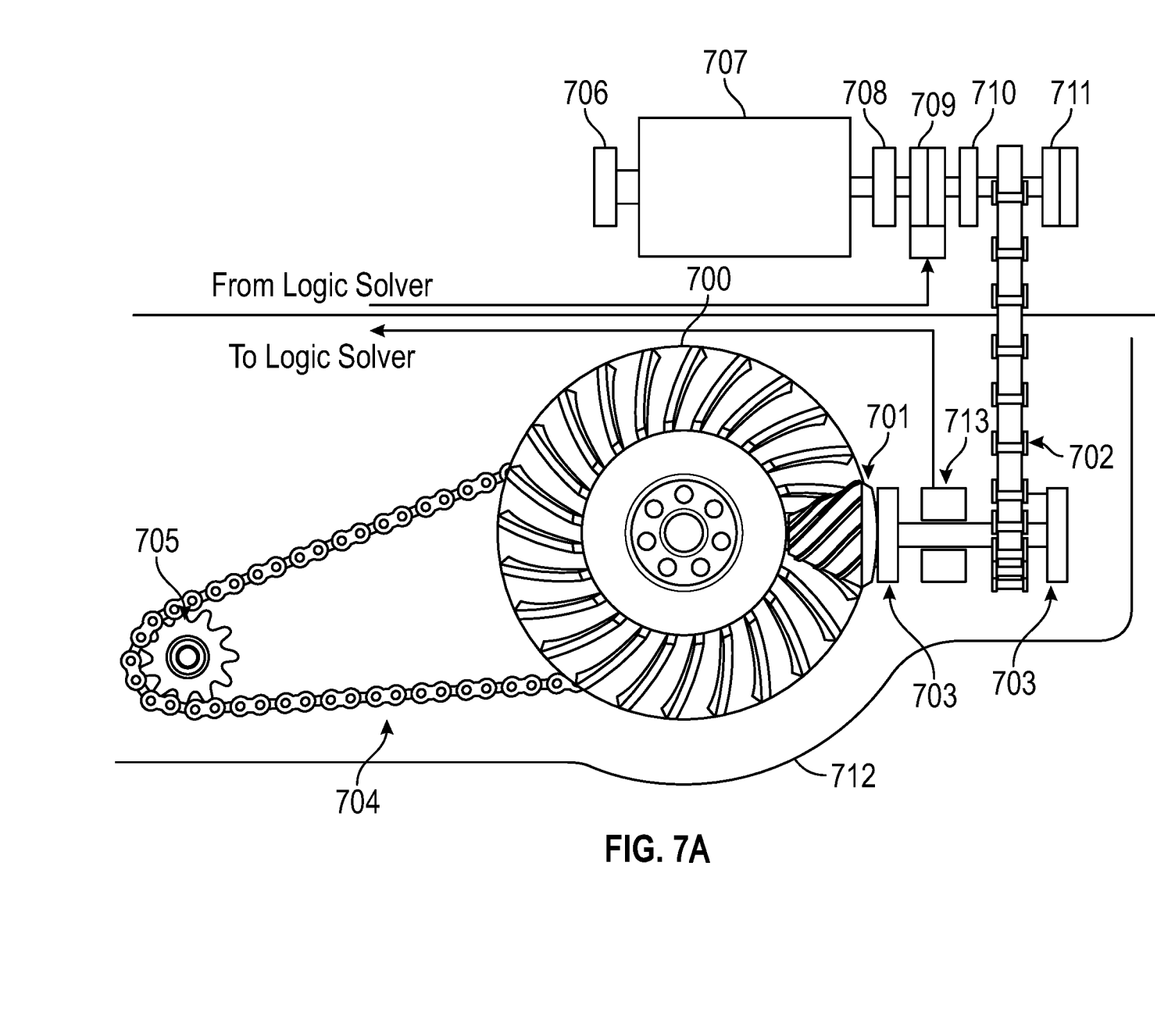
FIG. 7A shows a section view of a wheel-pipe coupler generator of a conduit inspection tool according to the present disclosure.
Figure 7B:
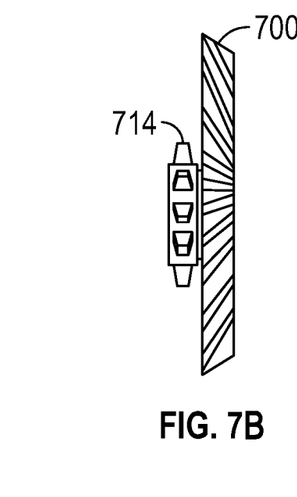
FIG. 7B shows a ring gear coupled to a pinion gear of a conduit inspection tool according to the present disclosure.

Turning briefly to FIG. 7A, the pinion 705 of a wheel-pipe coupler generator 1018 of FIG. 1 starts to rotate and transmit rotational motion by a chain 704 to a rear pinion gear 714 shown in FIG. 7B, which in turn transmits rotation and torque by a ring gear 700 to a spiral pinion 701, and from it to a coupling chain 702 to a flywheel 707. A flywheel shaft spins through bearings 706 and 708. A clutch 709 (also shown as electric clutch 1037) action is controlled by the logic solver 1009 through a control bus signal 1032. When the speed of the conduit inspection tool 10 in the conduit 913 reaches the preset speed in the logic solver 1009, the clutch 709 (electric clutch 1037) is activated (by signal 1036) allowing the rotation of a flywheel accumulator 707. A torque output (output 1035) is measured by a torque sensor 713 (also shown as torque sensor 1034) that is connected to the logic solver 1009.

When an alignment of a patterned magnet 1005 and the reader 1004 is reached, the logic solver 1023 of a charger (enclosed in dashed lines) can provide an audio-visual alarm 1033 to an operator of the conduit inspection tool 10. Next, a logic solver charging sequence starts by generating an alternated magnetic flux by the coil 1003 across a receiving coil 1000, which connects to the external charging unit power conditioning unit 1007 which connects to the main power conditioning unit 1022.

In some aspects, the external charging unit power conditioning unit 1007 provides stabilized electrical power by reducing energy spikes to the power conditioning (primary) unit 1022, which rectifies the power signal. The logic solver 1009 reads the charging level in the electrical energy storage unit 1015. When a desired (for example, pre-programmed) level is reached, the power monitoring unit 1012 can transmit a signal 1011 to the logic solver 1009 to stop charging. The logic solver 1009 can then send a signal 1031 to the communication unit 1010, which provides a signal 1030 to the transceiver 1028 that reaches the transceiver 1027 to finally communicate the full charger status to the portable charger unit logic solver 1023. A full charge status condition can be signaled to the operator of the conduit inspection tool 10 by the charger logic solver 1023 on the visual indication unit 1033.

Referring to FIG. 1, if the conduit inspection tool 10 stops moving or gets stuck in the conduit 913, a Kaplan turbine generator 1021 can produce an electrical output that is connected to the main power conditioning unit 1022 that initiates charging of a battery bank 1015. An odometer 1024 provides a signal to the logic solver 1009, which determines when the wheel-pipe coupler generator 1018 can be activated by pulling out coupling wheels of the conduit inspection tool 10 to contact an inner wall of the conduit 913. The wheel pipe coupler generator 1018 can provide an electrical output 1019 to the main power conditioning unit 1022. The logic solver 1009 can then determine when the speed of the conduit inspection tool 10 is sufficient to load the flywheel accumulator of the wheel-pipe coupler generator 1018, which is activated, for example, only when there is sufficient kinetic energy while the conduit inspection tool 10 is in moving contact with the conduit 913. In some aspects, the wheel-pipe coupler generator 1018 is utilized, for example, only during sufficiently high velocity movement of the conduit inspection tool 10 in the conduit 913 or sufficiently rapid deceleration of the conduit inspection tool 10 in the conduit 913 that can take place prior to a full stop of the conduit inspection tool 10 in the conduit 913.

Figure 2A:
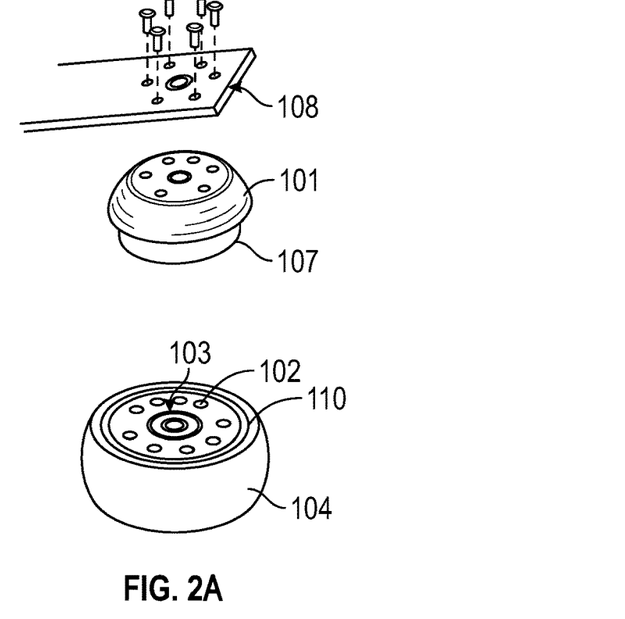
FIG. 2A is an isometric view of a stator and a supporting plate of a wheel generator of a conduit inspection tool according to the present disclosure.

FIG. 2A is an isometric view of a stator and a supporting plate of a wheel generator of a conduit inspection tool according to the present disclosure. For example, as shown, FIG. 2A shows the stator 101 and supporting plate 108 of the rotor wheel generator 1029 of the conduit inspection tool 10. The wheel generator 1029, in this example implementation, comprises the stator 101 and a rotor wheel generator 104. In this figure, the stator 101 and supporting plate 108 as shown in an exploded (disassembled) view. The stator 101 includes a protruding ring (or nipple) 107, which can enter into a groove 110 formed in the rotor wheel generator 104 in order to connect the stator 101 with the rotor wheel generator 104

Figure 2B:
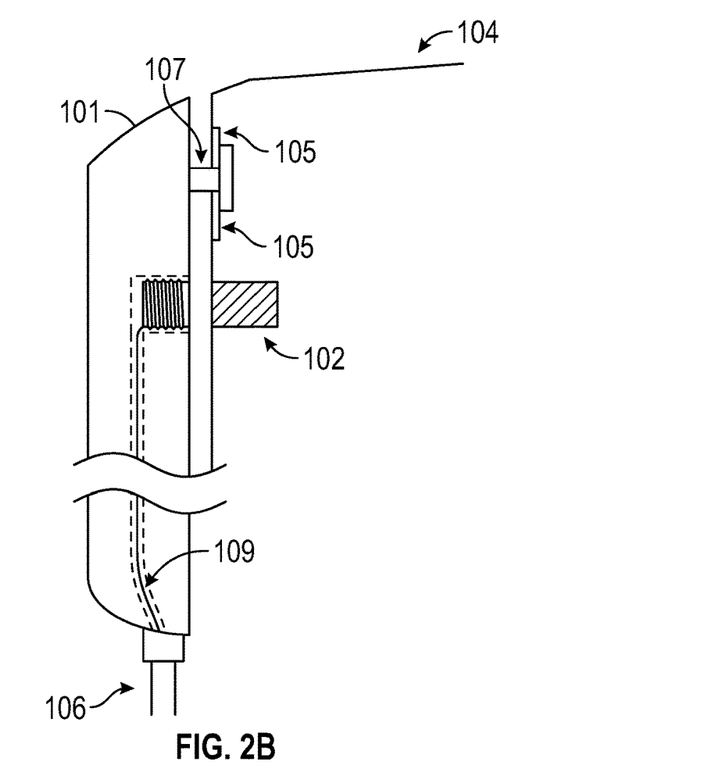
FIG. 2B is a side view of gasket ring plates on either side of a groove of the wheel generator of a conduit inspection tool according to the present disclosure.

FIG. 2B is a side view of gasket ring plates on either side of a groove of the wheel generator of the conduit inspection tool 10. As shown in this example, the gasket ring plates 105 on either side of the groove 110 are positioned to prevent blocking rotation of the rotor wheel generator 104 and prevent any debris and foreign particles that may be present in a fluid flowing in the conduit 913 to enter an area where permanent magnets 102 are inserted in the rotor wheel generator 104. For example, an arrangement of magnets 102 distributed around a central bearing 103 allows the rotor wheel generator 104 to deliver an alternating current induced in the coils inserted in the stator 101. FIG. 2B shows a sectional view of the stator 101, the inner ring 107, inner and outer gasket ring plates 105, and permanent magnet 102. Coil wiring 109 can be directed to the power conditioning unit 1022 through coil electrical conduit 106.

Figure 3A:
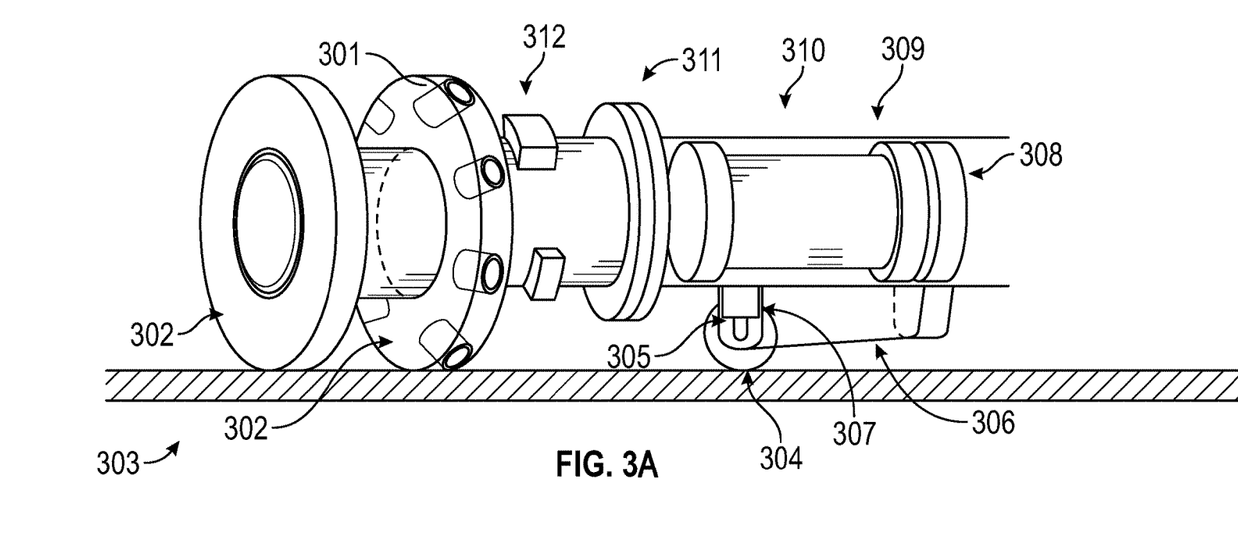
FIG. 3A shows an isometric view of a main body of a conduit inspection tool according to the present disclosure superimposed to a half section view of a conduit.

FIG. 3A shows an isometric view of a main body of a conduit inspection tool according to the present disclosure superimposed to a half section view of a conduit. In FIG. 3A, as shown, the main body 303 of the conduit inspection tool 10 is superimposed to a half section view of the conduit (here represented by a double hashed line). In this example, receiving coils 301 generate an alternating current induced by the external charging unit 1007 (not shown in FIG. 3A). The coils 301 are inserted in ring cups 302, which are in contact with the inner wall of the conduit.

Figure 3B:
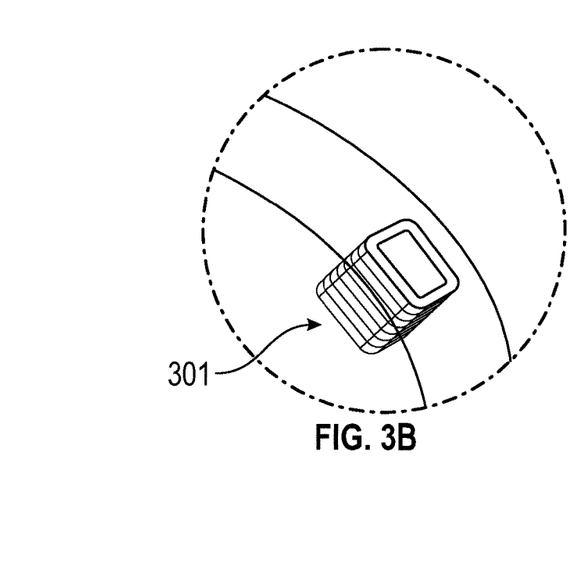
FIG. 3B shows an isolated view of a receiving coil that generates alternating electrical current from an external portable charging unit of a conduit inspection tool according to the present disclosure.

In this example, data communication unit 312 receives data from the external portable unit 1007. The magnetic patterned alignment magnet 1005 is attached to the body 303 of the conduit inspection tool 10. A front part of the body 303 is joined with a rear part 310 of the body 303 by a flanged connection 311 (for example, with bolts and nuts). The rear body part 310 contains the wheel-pipe coupler generator 309 placed inside the body rear part 310. The transmission mechanism is contained in the enclosure 308 attached to the generator body 309, which contains a flywheel accumulator. The bottom enclosure 306 contains a chain joining a pinion of the pivoting wheel 304 with a spiral ring gear that transmits the motion to the flywheel accumulator. Turning briefly to FIG. 3B, this figure shows the receiving coil 301 (also labeled as 1000) that generates alternating electrical current from the external portable charging unit 1053.

Figure 4:
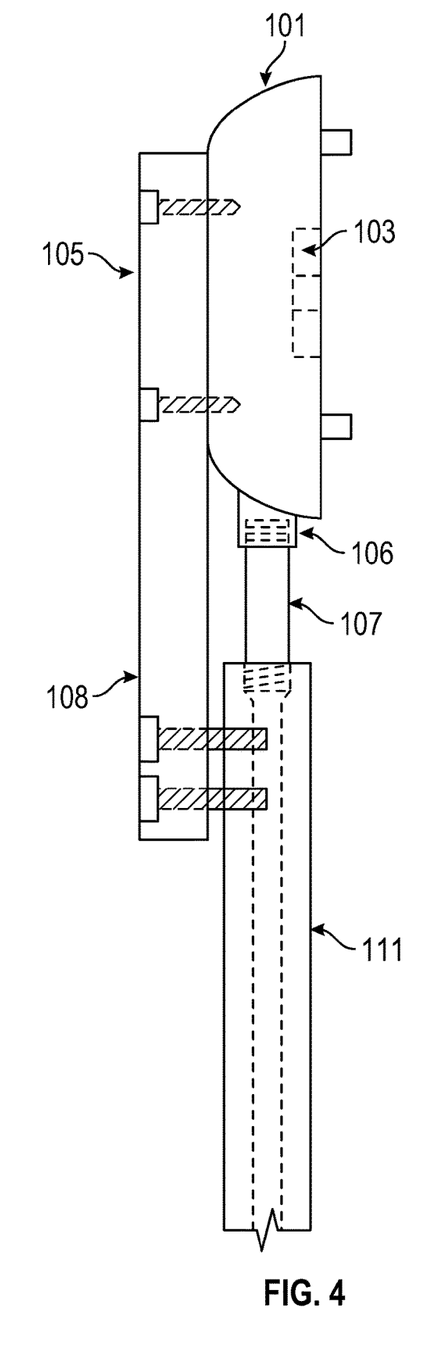
FIG. 4 shows a sectional view of a stator, a stator bearing, a supporting plate, and fixing screws that hold the stator attached to the supporting plate for a conduit inspection tool according to the present disclosure.
Figure 5:
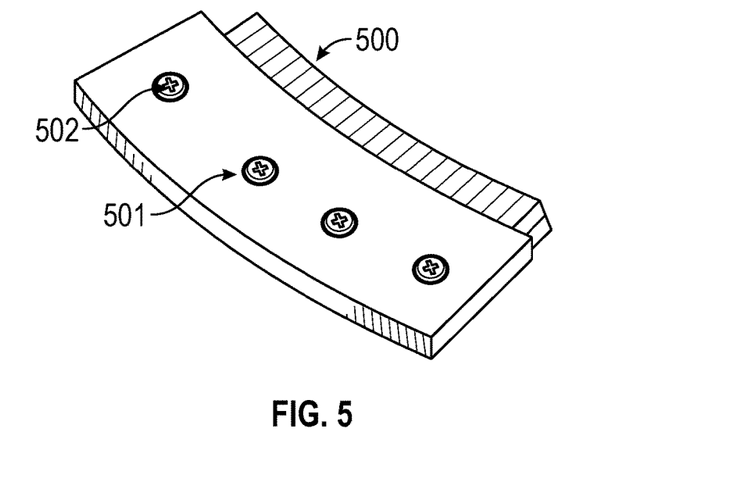
FIG. 5 shows a portion of gasket ring plates with fixing screws of a conduit inspection tool according to the present disclosure.

FIG. 4 shows a sectional view of a stator, a stator bearing, a supporting plate, and fixing screws that hold the stator attached to the supporting plate for the conduit inspection tool 10. For example, this figure shows a sectional view of the stator 101, the stator bearing 103, supporting plate 108, and fixing screws that hold the stator 101 attached to the supporting plate 108. The stator 101 includes an electrical conduit female bushing 106 that connects a threaded electrical nipple 107, which is threaded to a female threaded conduit 111. The nipple 107 and conduit 108 allow the electrical wiring of the stator coils to come out of the stator 101 towards the power conditioning unit 1022. Turning briefly to FIG. 5, this figure shows a portion of the gasket ring plates with fixing screws 502 and, placed under the rings, elastomeric gaskets 501.

Figure 6:
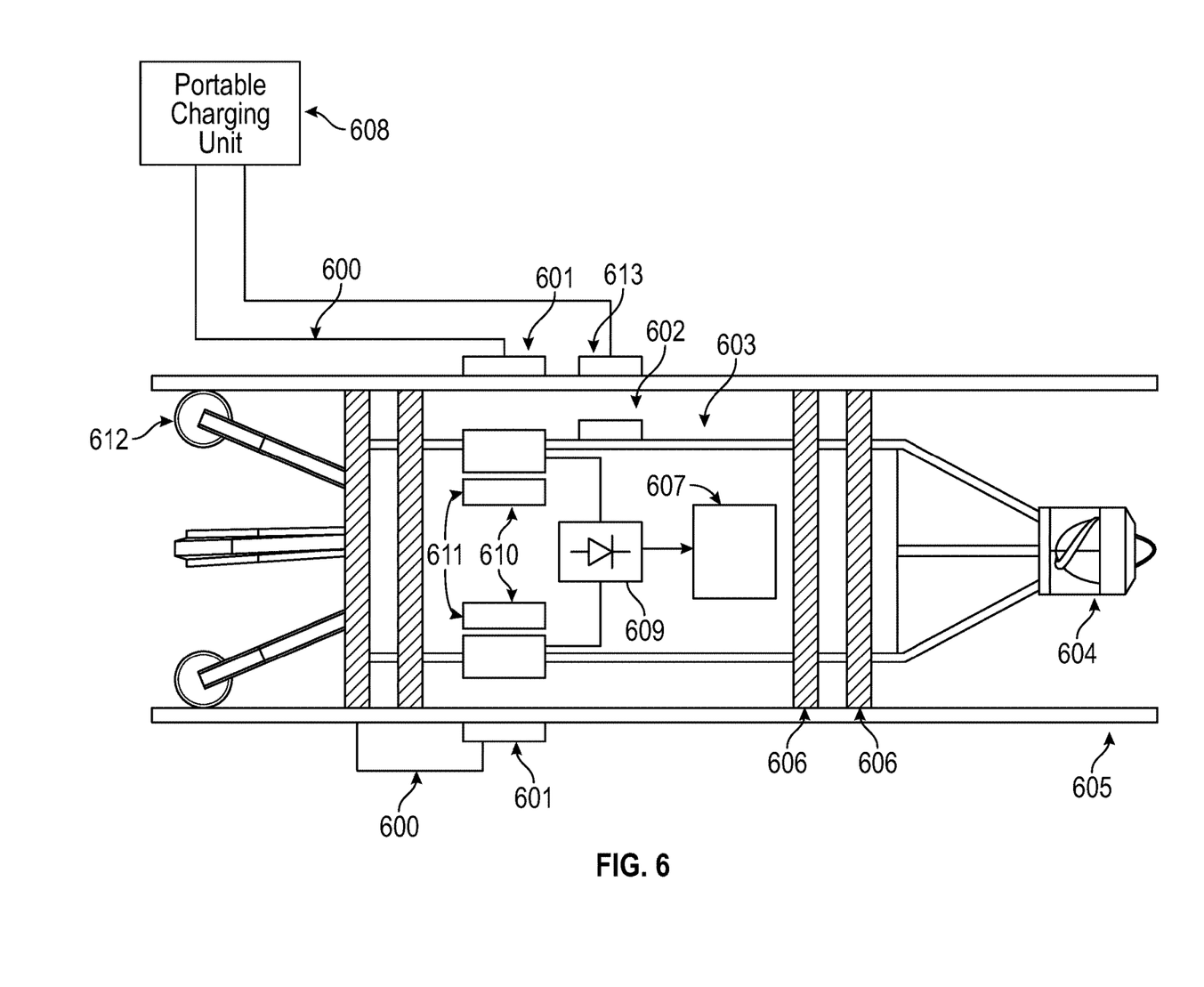
FIG. 6 shows a schematic illustration of at least a portion of a conduit inspection tool in a conduit of according to the present disclosure.

FIG. 6 shows a schematic illustration of at least a portion of conduit inspection tool 10 in a conduit. More specifically, FIG. 6 shows the Kaplan turbine generator 604 that, in the case of the conduit inspection tool 10 being stuck in a position while fluid in the conduit continues flowing, can produce electrical energy to be used by the conduit inspection tool 10 in order to resume movement in the conduit. Alternatively or additionally, an operator of the conduit inspection tool 10 can connect an external portable charging unit 608 to the conduit inspection tool 10 to produce movement in such situations. In this example, the external portable charging unit 608 can include electrical coils 601 placed around an external surface of the conduit 605 (for example, where the conduit inspection tool 10 is stuck), magnetic position reader 602, the charging unit logic solver 1023, the external charge source 1026, and the transceivers 1027 and 1028.

In this example, the power coils 601 are magnetically coupled to the permanent magnet 610, which produces a magnetic field across the p coils 611. The power coils 601 generate an alternating magnetic flux across the receiving coils 611, which are connected to the power conditioning unit 609. In this example, the locations of the power conditioning unit 609 and battery storage unit 607 are placed inside the body 603 of the conduit inspection tool 10. An odometer 612 measures the speed of the conduit inspection tool 10 as the body 603 is moving normally within the conduit 605 in the direction of the fluid flow. The odometer 612 can produce a signal that is sent to the logic solver 1009. When the operator positions the portable charging charge unit 608, the unit 608 can keeps rotating until it is aligned with the alignment reader 1004 finds magnetic alignment patterned magnet 1005.

FIG. 7A shows a section view of a wheel-pipe coupler generator 1018 of the conduit inspection tool 10. More specifically, FIG. 7A shows the enclosure contour 712, the primary transmission chain that transmits rotational motion from a pivoting wheels pinion 705 to the spiral ring gear 700, which is geared to a spiral pinion 701. The shaft of the spiral pinion 701 is supported by bearings 703. The secondary transmission chain 702 transmits rotation motion to the flywheel accumulator 707 by two pinion gears (not shown on FIG. 7A). Each pinion gear is located at an end of the chain 702, for example, one on the flywheel side and one on the spiral pinion side.

The shaft of the flywheel side pinion gear is supported by bearings 710 and 711. The electrical clutch 709 can receive an on/off signal from the logic solver 1009, when the desired speed of the conduit inspection tool 10 has been reached. The flywheel accumulator 707 shaft is supported by the bearings 706 and 708.

Figure 8B:
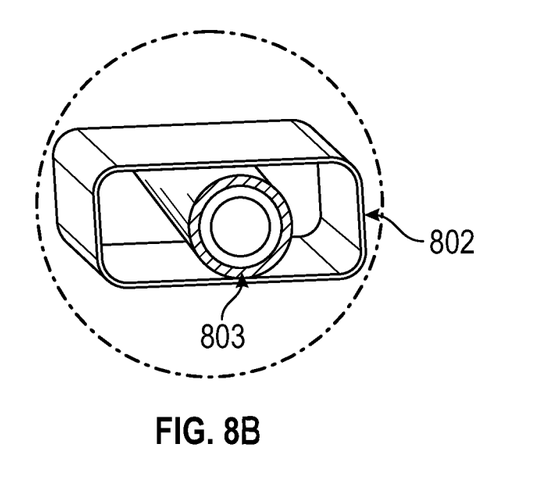
FIG. 8B shows an isolated view of a bearing moved into a slider ring of a wheel of a conduit inspection tool according to the present disclosure.

FIG. 8A shows an example implementation of wheels and a push-pull mechanism of a wheel-pipe coupler generator of the conduit inspection tool 10. As shown in this figure, a pair of wheels 804 are linked to each other by a shaft. At each end of the shaft, a bearing 803 moves into a slider ring 802 (also more specifically shown in FIG. 8B) that allows the shaft to move up and down on a curved trajectory by a force of a solenoid piston 805 placed at each end of the shaft. Thus, the two wheels 804 move to follow identical trajectories given by identical grooves machined in the guiding grooved plates 305 of each wheel 804.

Figure 9:
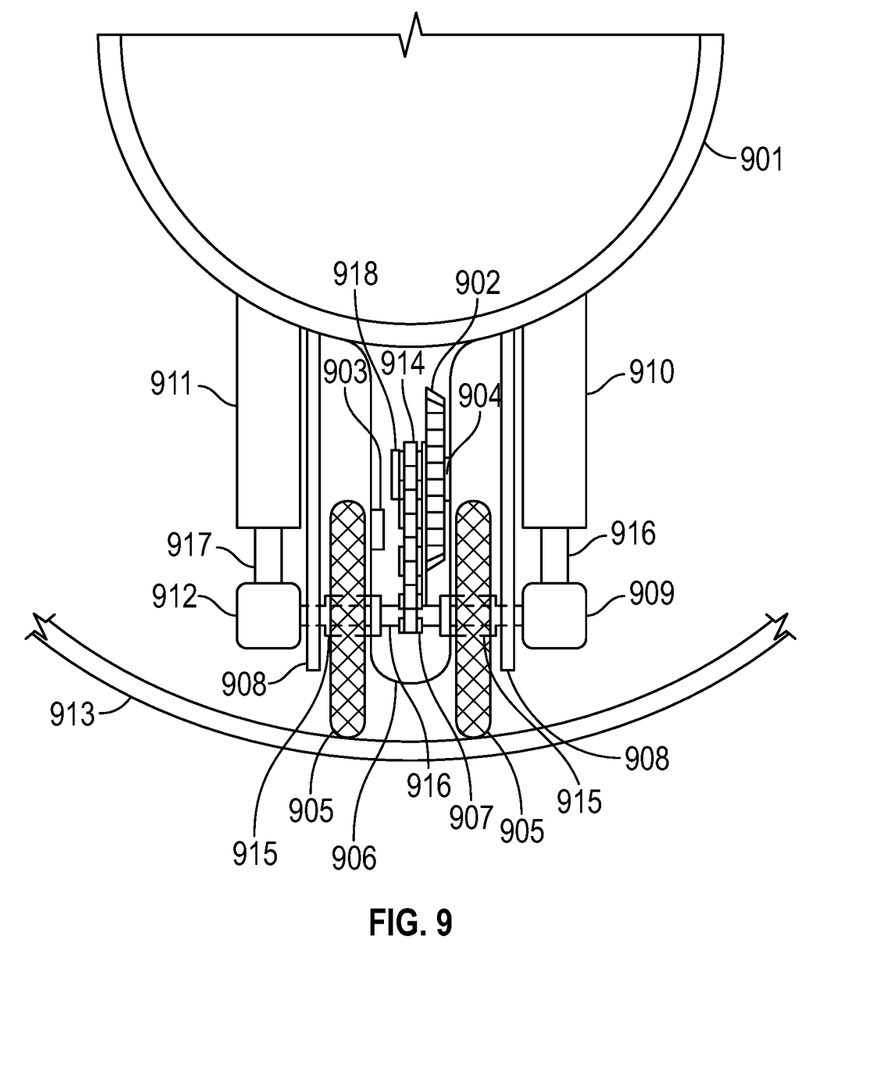
FIG. 9 shows a front view of a wheel-pipe coupler generator of a conduit inspection tool according to the present disclosure.

FIG. 9 shows a front view of a wheel-pipe coupler generator of the conduit inspection tool 10. As shown, the pair of wheels 905 establishes contact with the inner wall of the conduit 913 when the solenoids 910 and 911 push the respective pair of pistons 916 and 917. The shaft bushings 915 of the wheels 905 are mechanically linked to the wheels pinion gear 705 shown in FIG. 7A, which is hidden behind the primary transmission chain 914. The grooved plates 908 are attached to the body 901 of the conduit inspection tool 10, as well as to the solenoids 910 and 911. The solenoid pistons 916 and 917 allow the wheels 905, along with the bushing shafts 915, to move up and down to touch the inner wall of the conduit 913. The spiral ring gear 902 shaft is sustained by the bearings 904 and 918.

Figure 10:
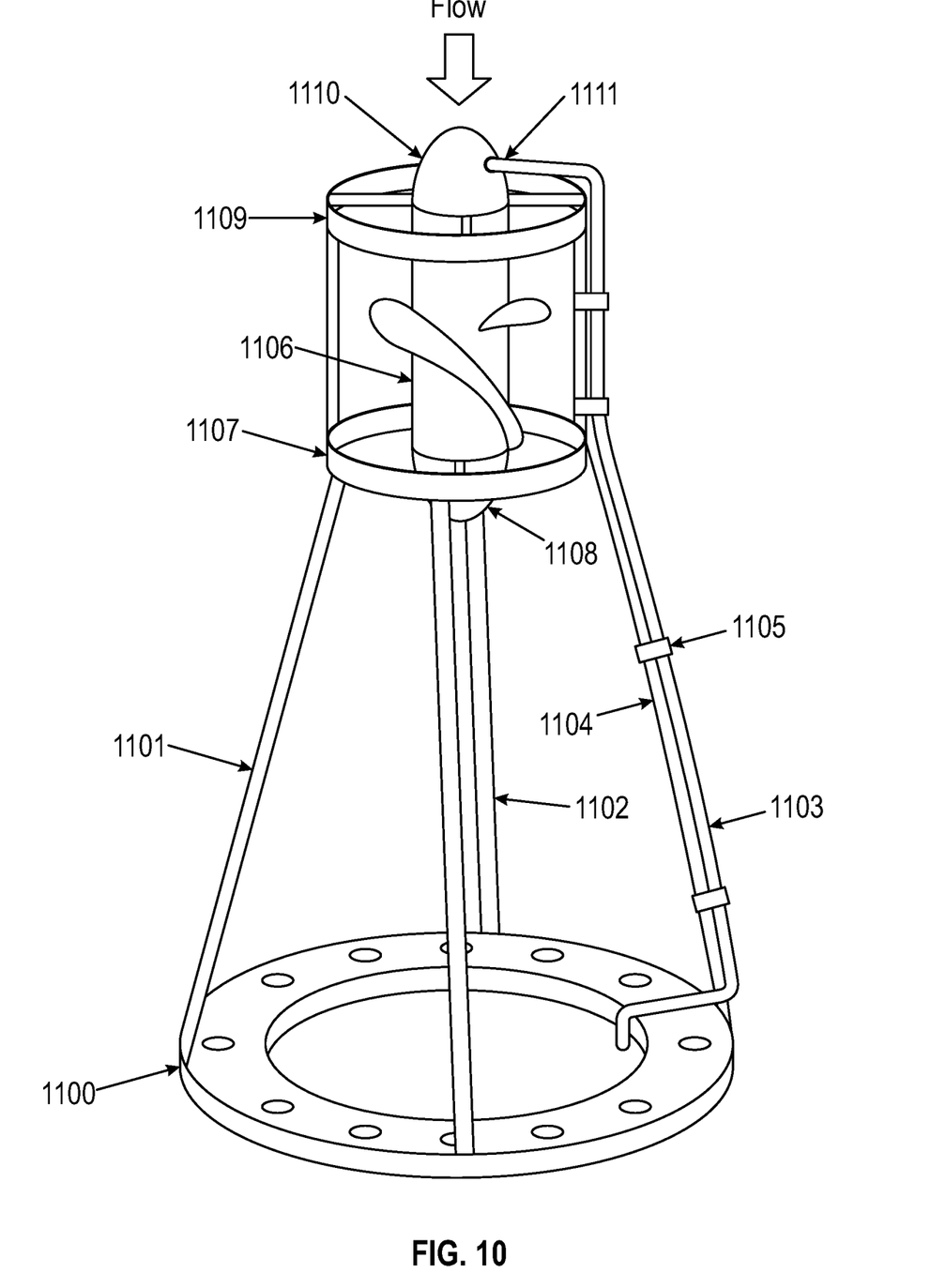
FIG. 10 shows an isometric view of a turbine generator of a conduit inspection tool according to the present disclosure.

FIG. 10 shows an isometric view of a turbine generator of the conduit inspection tool 10. As shown, the Kaplan turbine 1106 is supported on each end by ring frames 1107 and 1109. The electrical output power and sensors wiring of the electrical generator unit 1110 can be run in the conduit 1111. A mechanical bearing of the Kaplan turbine 1106 is located in the electrical generator unit 1110 and the bearing enclosure 1108, respectively. The bearing enclosure 1108 can provide mechanical support to the bearing and is mechanically liked to the ring frame 1107. In turn, the ring frame 1107 is supported by the holding arms 1101, 1102, and 1104, which are attached mechanically to the main holding flange 1100. The main holding flange 1100 is in turn attached to the body of the conduit inspection tool 10.

Figure 11:
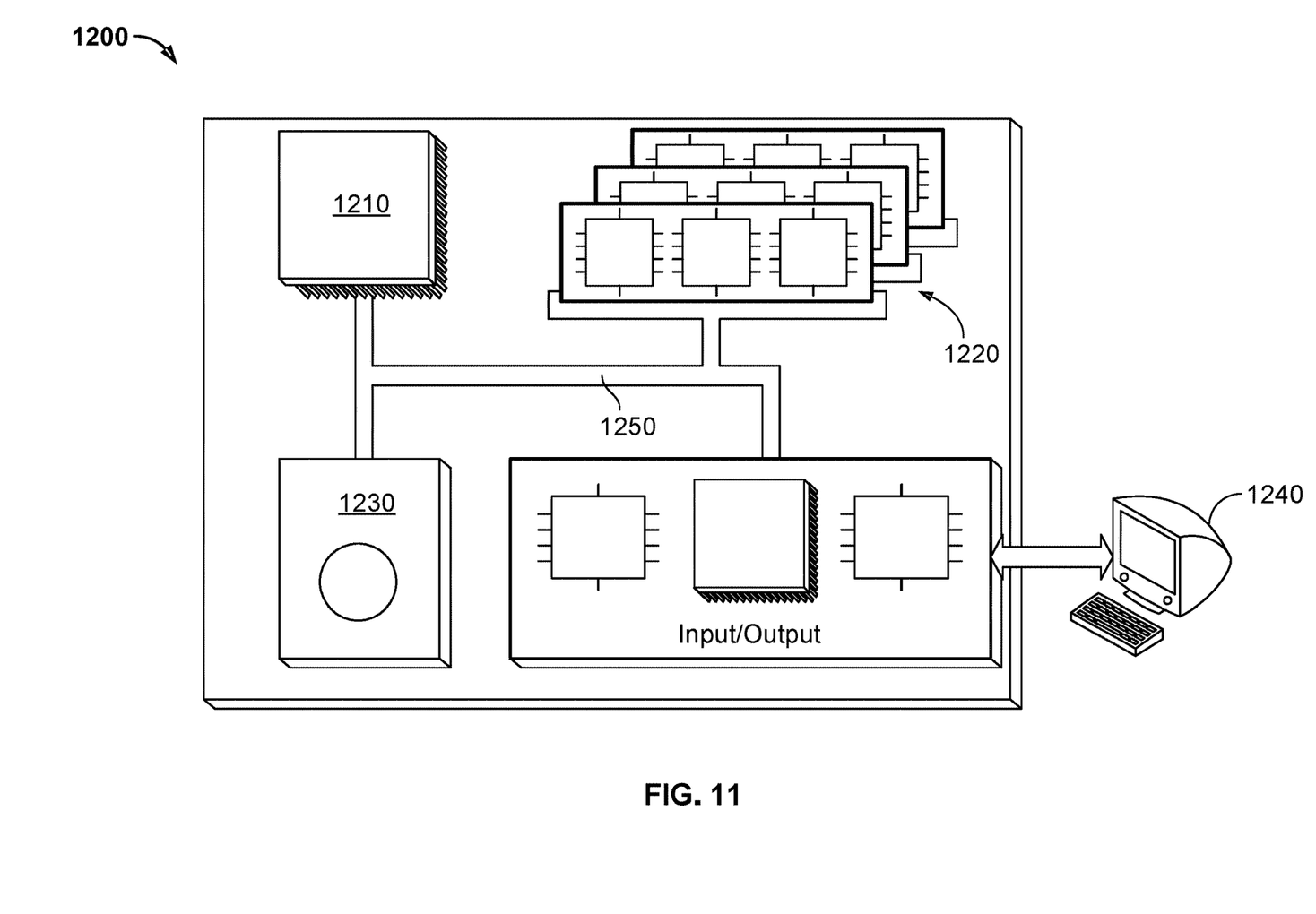
FIG. 11 is a schematic illustration of an example controller (or control system) for a conduit inspection tool according to the present disclosure.

FIG. 11 is a schematic illustration of an example controller 1200 (or control system) for a conduit inspection tool. For example, all or parts of the controller 1200 can be used for the operations described previously. The controller 1200 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the controller 1200. The processor may be designed using any of a number of architectures. For example, the processor 1210 may be a CISC (Complex Instruction Set Computers) processor, a RISC (Reduced Instruction Set Computer) processor, or a MISC (Minimal Instruction Set Computer) processor.

In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the controller 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the controller 1200. In one implementation, the storage device 1230 is a computer-readable medium. In various different implementations, the storage device 1230 may be a floppy disk device, a hard disk device, an optical disk device, a tape device, flash memory, a solid state device (SSD), or a combination thereof.

The input/output device 1240 provides input/output operations for the controller 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A conduit inspection tool system, comprising:
a conduit inspection tool that comprises:
a body that comprises one or more wheels configured to move the body through and in contact with a conduit;
at least two power generating sub-systems coupled to the body, each of the at least two power generating sub-systems configured to generate electrical power to operate the one or more wheels to move the body through and in contact with the conduit, the at least two power generating sub-systems comprising a wheel-pipe coupler generator that comprises one or more gears rotatingly coupled to the one or more wheels and a flywheel, the flywheel configured to generate direct electrical power from rotation of the one or more gears based on movement of the one or more wheels in the conduit; and
at least one energy storage device electrically coupled to the at least two power generating sub-systems, the at least one energy storage device configured to store electrical power generated by the at least two power generating sub-systems; and
a control system communicably coupled to the at least two power generating sub-systems and the at least one energy storage device.

2. The conduit inspection tool system of claim 1, wherein the at least two power generating sub-systems comprise a wheel generator electrically coupled to the one or more wheels and comprising a power generator configured to generate alternating electrical power from movement of the one or more wheels in the conduit.

3. The conduit inspection tool system of claim 1, wherein the at least one energy storage device comprises the flywheel.

4. The conduit inspection tool system of claim 1, wherein the at least two power generating sub-systems comprise a Kaplan turbine generator configured to generate alternating electrical power based on a flow of fluid in the conduit and through the Kaplan turbine generator when the one or more wheels are immobile in the conduit.

5. The conduit inspection tool system of claim 1, wherein the at least one energy storage device comprises an electrical energy storage unit and a mechanical energy storage unit.

6. The conduit inspection tool system of claim 5, wherein the electrical energy storage unit comprises one or more batteries, and the mechanical energy storage unit comprises a flywheel.

7. The conduit inspection tool system of claim 5, further comprising a power conditioning unit electrically coupled between the at least two power generating sub-systems and the at least one energy storage device.

8. The conduit inspection tool system of claim 1, further comprising an external charging sub-system configured to transfer electrical power from an external charge source to the at least one energy storage device.

9. The conduit inspection tool system of claim 8, wherein the external charging sub-system comprises one or more permanent magnets and one or more receiving coils mounted in the body, the one or more receiving coils configured to receive an electric charge from one or more power coils of the external charge source positioned adjacent the body, the one or more permanent magnets configured to generate an alternating magnetic flux based on the electric charge to generate alternating electric power.

10. The conduit inspection tool system of claim 1, wherein the conduit comprises a hydrocarbon pipeline, and the conduit inspection tool comprises a pipeline scraper.

11. A conduit inspection tool system, comprising:
a conduit inspection tool that comprises:
a body that comprises one or more wheels configured to move the body through and in contact with a conduit;
at least two power generating sub-systems coupled to the body, each of the at least two power generating sub-systems configured to generate electrical power to operate the one or more wheels to move the body through and in contact with the conduit; and
at least one energy storage device electrically coupled to the at least two power generating sub-systems, the at least one energy storage device configured to store electrical power generated by the at least two power generating sub-systems, the at least one energy storage device comprising an electrical energy storage unit and a mechanical energy storage unit, the electrical energy storage unit comprising one or more batteries, and the mechanical energy storage unit comprising a flywheel; and
a control system communicably coupled to the at least two power generating sub-systems and the at least one energy storage device.

12. The conduit inspection tool system of claim 11, wherein the at least two power generating sub-systems comprise a wheel generator electrically coupled to the one or more wheels and comprising a power generator configured to generate alternating electrical power from movement of the one or more wheels in the conduit.

13. The conduit inspection tool system of claim 11, wherein the at least two power generating sub-systems comprise a Kaplan turbine generator configured to generate alternating electrical power based on a flow of fluid in the conduit and through the Kaplan turbine generator when the one or more wheels are immobile in the conduit.

14. The conduit inspection tool system of claim 11, further comprising a power conditioning unit electrically coupled between the at least two power generating sub-systems and the at least one energy storage device.

15. The conduit inspection tool system of claim 11, further comprising an external charging sub-system configured to transfer electrical power from an external charge source to the at least one energy storage device.

16. The conduit inspection tool system of claim 15, wherein the external charging sub-system comprises one or more permanent magnets and one or more receiving coils mounted in the body, the one or more receiving coils configured to receive an electric charge from one or more power coils of the external charge source positioned adjacent the body, the one or more permanent magnets configured to generate an alternating magnetic flux based on the electric charge to generate alternating electric power.

17. The conduit inspection tool system of claim 11, wherein the conduit comprises a hydrocarbon pipeline, and the conduit inspection tool comprises a pipeline scraper.

18. A conduit inspection tool system, comprising:
a conduit inspection tool that comprises:
a body that comprises one or more wheels configured to move the body through and in contact with a conduit;
at least two power generating sub-systems coupled to the body, each of the at least two power generating sub-systems configured to generate electrical power to operate the one or more wheels to move the body through and in contact with the conduit;
at least one energy storage device electrically coupled to the at least two power generating sub-systems, the at least one energy storage device configured to store electrical power generated by the at least two power generating sub-systems, the at least one energy storage device comprising an electrical energy storage unit and a mechanical energy storage unit; and
a power conditioning unit electrically coupled between the at least two power generating sub-systems and the at least one energy storage device and
a control system communicably coupled to the at least two power generating sub-systems and the at least one energy storage device.

19. The conduit inspection tool system of claim 18, wherein the at least two power generating sub-systems comprise a wheel generator electrically coupled to the one or more wheels and comprising a power generator configured to generate alternating electrical power from movement of the one or more wheels in the conduit.

20. The conduit inspection tool system of claim 18, wherein the at least two power generating sub-systems comprise a Kaplan turbine generator configured to generate alternating electrical power based on a flow of fluid in the conduit and through the Kaplan turbine generator when the one or more wheels are immobile in the conduit.

21. The conduit inspection tool system of claim 18, wherein the electrical energy storage unit comprises one or more batteries, and the mechanical energy storage unit comprises a flywheel.

22. The conduit inspection tool system of claim 18, further comprising an external charging sub-system configured to transfer electrical power from an external charge source to the at least one energy storage device.

23. The conduit inspection tool system of claim 22, wherein the external charging sub-system comprises one or more permanent magnets and one or more receiving coils mounted in the body, the one or more receiving coils configured to receive an electric charge from one or more power coils of the external charge source positioned adjacent the body, the one or more permanent magnets configured to generate an alternating magnetic flux based on the electric charge to generate alternating electric power.

24. The conduit inspection tool system of claim 18, wherein the conduit comprises a hydrocarbon pipeline, and the conduit inspection tool comprises a pipeline scraper.

25. A conduit inspection tool system, comprising:
a conduit inspection tool that comprises:
a body that comprises one or more wheels configured to move the body through and in contact with a conduit;
at least two power generating sub-systems coupled to the body, each of the at least two power generating sub-systems configured to generate electrical power to operate the one or more wheels to move the body through and in contact with the conduit;
at least one energy storage device electrically coupled to the at least two power generating sub-systems, the at least one energy storage device configured to store electrical power generated by the at least two power generating sub-systems; and
an external charging sub-system configured to transfer electrical power from an external charge source to the at least one energy storage device; and
a control system communicably coupled to the at least two power generating sub-systems and the at least one energy storage device.

26. The conduit inspection tool system of claim 25, wherein the at least two power generating sub-systems comprise a wheel generator electrically coupled to the one or more wheels and comprising a power generator configured to generate alternating electrical power from movement of the one or more wheels in the conduit.

27. The conduit inspection tool system of claim 25, wherein the at least two power generating sub-systems comprise a Kaplan turbine generator configured to generate alternating electrical power based on a flow of fluid in the conduit and through the Kaplan turbine generator when the one or more wheels are immobile in the conduit.

28. The conduit inspection tool system of claim 25, wherein the at least one energy storage device comprises an electrical energy storage unit and a mechanical energy storage unit.

29. The conduit inspection tool system of claim 25, wherein the external charging sub-system comprises one or more permanent magnets and one or more receiving coils mounted in the body, the one or more receiving coils configured to receive an electric charge from one or more power coils of the external charge source positioned adjacent the body, the one or more permanent magnets configured to generate an alternating magnetic flux based on the electric charge to generate alternating electric power.

30. The conduit inspection tool system of claim 25, wherein the conduit comprises a hydrocarbon pipeline, and the conduit inspection tool comprises a pipeline scraper.

\* \* \* \* \*